Jan. 18, 1966    A. C. WICKMAN    3,229,422
MANUFACTURE OF TOOTHED GEAR WHEELS
Filed Sept. 22, 1961    10 Sheets-Sheet 3

INVENTOR:-
AXEL CHARLES WICKMAN
BY: Mawhinney & Mawhinney
ATTORNEY

Jan. 18, 1966 A. C. WICKMAN 3,229,422
MANUFACTURE OF TOOTHED GEAR WHEELS
Filed Sept. 22, 1961 10 Sheets-Sheet 5

INVENTOR:—
AXEL CHARLES WICKMAN
BY:— Mawhinney & Mawhinney
ATTORNEYS

United States Patent Office 3,229,422
Patented Jan. 18, 1966

3,229,422
MANUFACTURE OF TOOTHED GEAR WHEELS
Axel C. Wickman, 14 S. Hibiscus Drive, Hibiscus Island, Miami Beach, Fla.
Filed Sept. 22, 1961, Ser. No. 139,913
19 Claims. (Cl. 51—80)

The invention relates to a method of, and apparatus for the manufacture of gear wheels, having cylindrical envelopes, and has for its object to produce them in a simple and expeditious manner.

The method of the invention broadly includes feeding a cylindrical blank, in the direction of its axis, between the facing peripheral portions of two laterally spaced grinding wheels with helically-arranged tooth-forming ribs on their peripheries such that the ribs, when the grinding wheels are driven in opposite senses in unison, rotate the blank at the same time as they grind the teeth therein.

More specifically, and for manufacturing an axially-toothed gear wheel, the method of the invention includes feeding a cylindrical blank, in the direction of its axis, between the facing peripheral portions of two laterally-spaced grinding wheels with helically-arranged tooth-forming ribs on their peripheries and having their axes oppositely inclined such that the portions of the ribs, at the adjacent sides of the two grinding wheels, which engage opposite sides of the blank are parallel to the axis of the latter, and that the ribs, when the grinding wheels are driven in opposite senses in unison, rotate the blank at the same time as they grind the teeth therein.

More specifically, and for manufacturing a helically-toothed gear wheel the method includes feeding a cylindrical blank, in the direction of its axis, between the facing perpiheral portions of two laterally-spaced grinding wheels with helically-arranged tooth-forming ribs on their peripheries such that the portions of the ribs, at the adjacent sides of the two grinding wheels, which engage opposite sides of the blank are inclined oppositely to each other at the helix angle to be given to the teeth of the gear wheel, and that the ribs, when the grinding wheels are driven in opposite directions in unison, rotate the blank at the same time as they grind the teeth therein.

Apparatus, according to the invention, broadly includes a pair of laterally-spaced grinding wheels with helically-arranged tooth-forming ribs on their peripheries and adapted to be driven in opposite senses, and means for feeding a cylindrical blank, in the direction of its length, through the pass between the grinding wheels, the helix angles of the helical ribs being such that their portions which engage the blank in the pass are parallel to the intended directions of the teeth.

According to a further feature, the apparatus, when for manufacturing an axially-toothed gear wheel, includes a pair of laterally-spaced grinding wheels with helically-arranged tooth-forming ribs on their peripheries, the grinding wheels being supported with their axes oppositely inclined in respective parallel planes and adapted to be driven in opposite senses, and means for feeding a cylindrical blank, in the direction of its length and parallelly between the said parallel planes, through the pass between the grinding wheels where they cross each other and at equal angles with each grinding wheel, the helix angles of the helical ribs, and the angles of inclination of the axes of the grinding wheels being such that the portions of the ribs which engage the blank in the pass are parallel to the axis of the blank.

According to a still further feature, the apparatus, when for manufacturing a helically-toothed gear wheel, includes a pair of parallel, laterally-spaced grinding wheels with helically-arranged tooth-forming ribs on their peripheries and adapted to be driven in opposite senses, and means for feeding a cylindrical blank, in the direction of its length, through the pass between the grinding wheels in a direction at right angles to the plane containing the axes of the grinding wheels, the helix angles of the helical ribs being such that their portions which engage the blank in the pass are directed for grinding the teeth at the desired helix angle.

According to an alternative further feature, the apparatus, when for manufacturing a helically-toothed gear wheel, includes a pair of laterally-spaced grinding wheels with helically-arranged tooth-forming ribs on their peripheries, the grinding wheels being supported with their axes oppositely inclined in respective parallel planes and adapted to be driven in opposite senses, and means for feeding a cylindrical blank, in the direction of its length, and parallelly between the said parallel planes, through the pass between the grinding wheels where they cross each other and at equal angles with each grinding wheel, the helix angles of the helical ribs, and the angles of inclination of the axes of the grinding wheels being such that the portions of the ribs which engage the blank in the pass are directed for grinding the teeth at the desired helix angle.

The grinding wheels can either have single helically-arranged toothed-forming ribs on their peripheries, or they could be provided with two or more of them arranged in the manner of a multi-start screw thread.

In the case where the direction of rotation of the grinding wheels opposes the passage of the blank through the pass between them, means can be provided for applying a feed movement to the blank; while in the case where the direction of rotation of the grinding wheels applies a feed for moving the blank through the pass between them, means are provided for reducing the speed of the said feed so that the teeth will be ground in the blank and the latter will not jamb between the grinding wheels.

According to a still further feature the blank is guided for the feed movement through the pass by a shaft, extending through the pass, on which the blank is journalled, or in accordance with a first alternative feature the blank is made fast with an axially-floating mandrel extending through the said pass, or in accordance with a second alternative feature the blank is guided for the feed movement through the pass by a tube in which it is inserted and which extends through the pass, where opposite sides of the tube wall are removed for giving the grinding wheels access to the blank.

In the accompanying drawings:

FIGURE 1 is a composite diagram illustrating one application of the method of the invention to the grinding of helical gear teeth in a cylindrical blank;

FIGURE 2 diagrammatically illustrates an alternative method of grinding helical teeth in a cylindrical blank;

FIGURE 3 diagrammatically illustrates an application of the method of the invention for grinding axially-directed gear teeth in a cylindrical blank;

FIGURE 4 is a diagrammatic view illustrating one manner in which the blanks can be fed for the grinding of the teeth therein;

FIGURES 5, 6, and 7 are modifications of FIGURE 4 as if taken on the line 5—5 of FIGURE 4;

Figure 11:
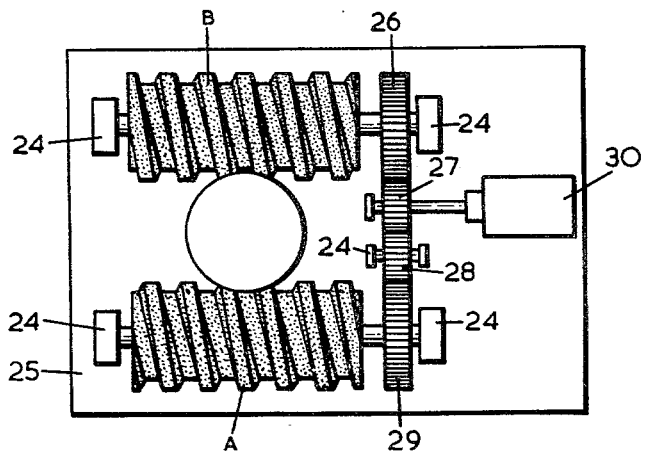
Figure 12:
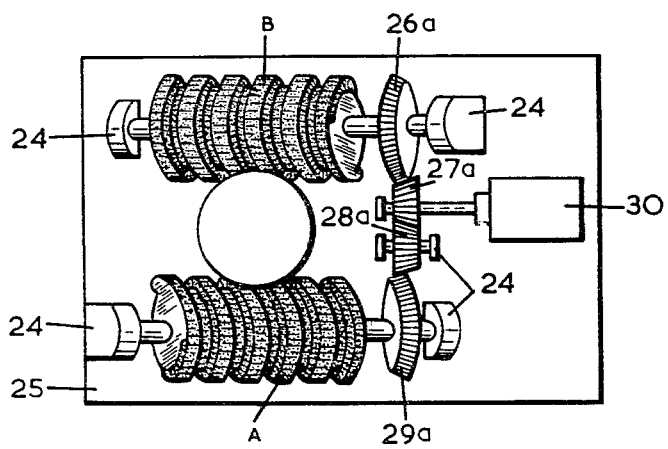

FIGURES 11 and 12 indicate two forms of apparatus to be used, and

Figure 13:
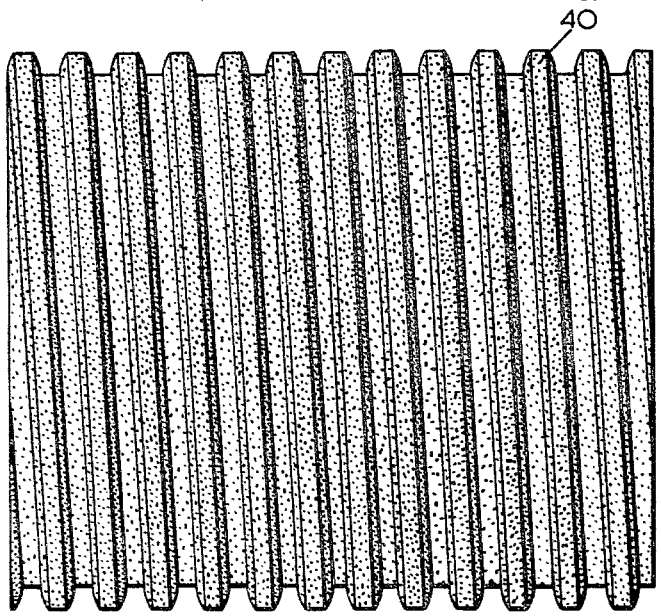
Figure 14:
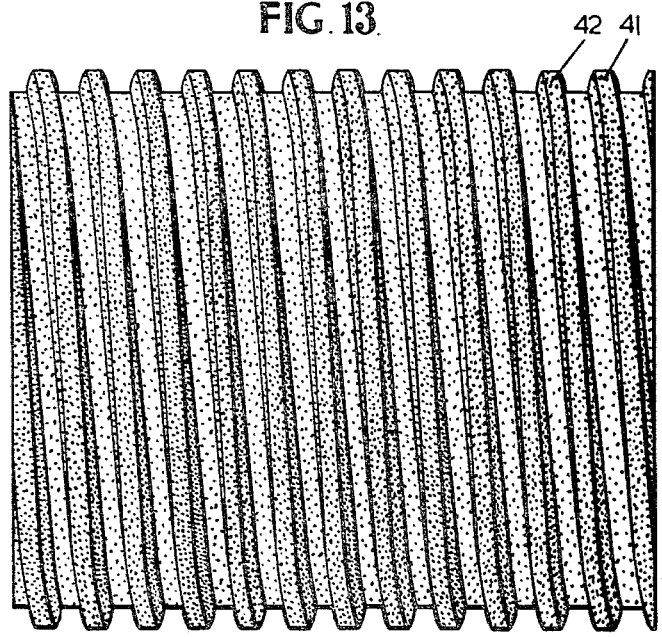

FIGURES 13 and 14 are respectively elevations of grinding wheels having a single helically-arranged grinding rib and having a pair of helically-arranged grinding ribs.

Figure 1:
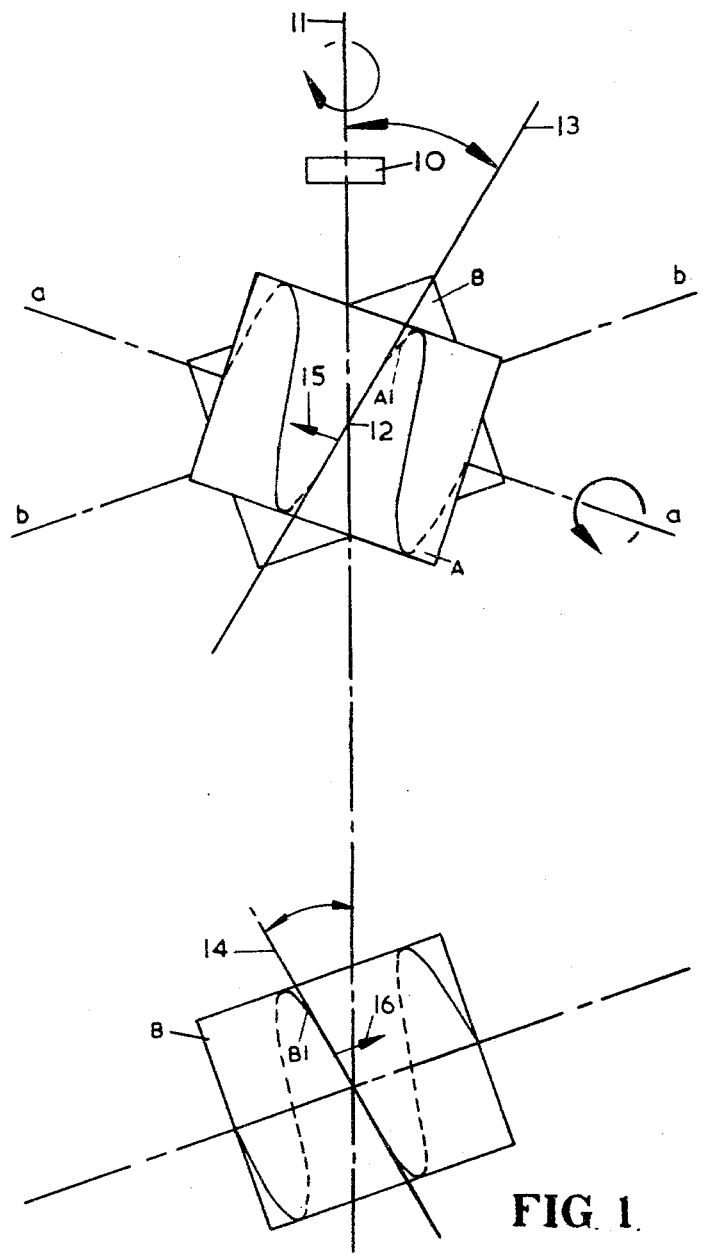
Figure 2:
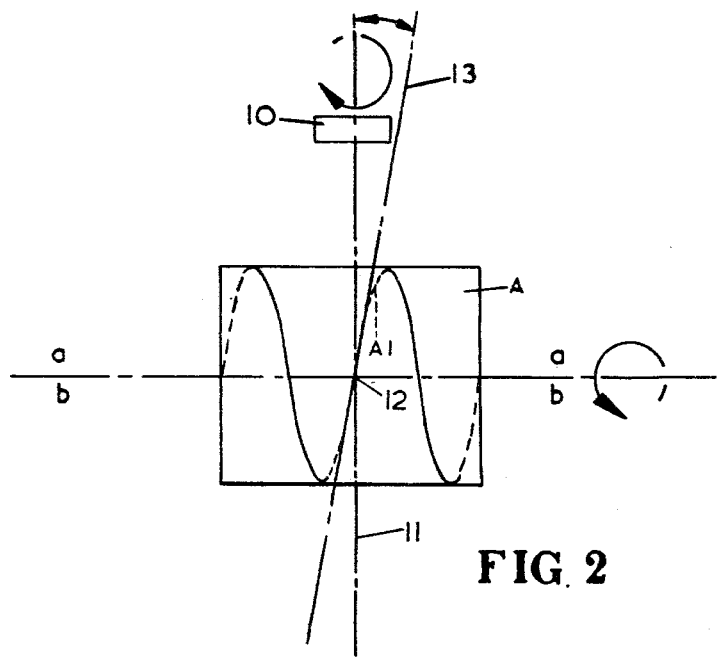
Figure 3:
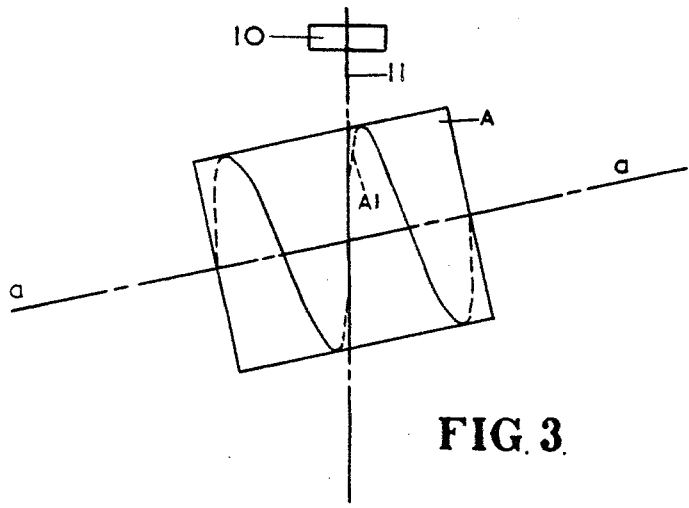

To facilitate a ready comprehension of the invention the grinding ribs are shown diagrammatically in FIGURES 1 to 3. Thus, it will be understood that although the grinding ribs are indicated in these figures by widely spaced helices the ribs, which may be of single-start or multi-start form, would be spaced appropriately to the pitch of the teeth to be ground in the workpiece. So that the form of such grinding wheels may readily be appreciated, FIGURE 13 shows a grinding wheel having a single helically-arranged grinding rib 40 and FIGURE 14 shows a grinding wheel having two helically-arranged grinding ribs 41 and 42. However the diameter of these grinding wheels and the profile of their ribs may be altered as desired to suit individual requirements. In FIGURE 1 is shown a cylindrical blank 10 spaced above a pair of grinding wheels A, B of which the former is shown superimposed on the latter; and for the sake of convenience the obscured wheel B has been redrawn at the bottom of the figure. In practice both grinding wheels would be of much greater proportional diameter to the blank than that shown.

The grinding wheels are respectively provided with helically-arranged, peripheral, tooth-forming grinding ribs A1 and B1, and these wheels have their axes of rotation $a$—$a$, $b$—$b$, respectively, equally and oppositely inclined with respect to the chain line 11, which latter indicates the axis of the blank and also the downward direction in the figure that the blank is fed for the grinding of the teeth. The axes $a$—$a$, $b$—$b$ lie in parallel planes, that for the former being above the plane of the paper in FIGURE 1 and that for the latter being below the plane of the paper by an equal amount. When viewed in a direction which is normal to these parallel planes the grinding wheel axes intersect each other on line 11 at point 12. At this point the adjacent sides of the two grinding wheels are closest to each other, and that distance is chosen with reference to the diameter of the blank.

For ease of illustration only a single helical grinding rib of long pitch has been shown on each grinding wheel, but in practice there may be several ribs arranged on each said wheel somewhat in the manner of a multi-start screw thread as indicated by FIGURE 14. It is arranged that rib A1 at the far side of grinding wheel A in FIGURE 1 shall have its portion closest to grinding wheel B at the helix angle of the tooth it is to form on the near side of the blank 10, and for the rib B1 at the near side of grinding wheel B in FIGURE 1 to have its portion closest to grinding wheel A at the helix angle of the tooth it is to form on the far side of the blank. The helix angle for the said portion of rib A1, is shown as that existing between lines 11 and 13 in FIGURE 1, while that for the corresponding portion of rib B1 is shown as existing between lines 11 and 14. Obviously, the helix angles for the said portions of ribs A1 and B1 are equal and opposite.

The grinding wheels are driven in unison in opposite senses at an appropriate speed for grinding the gear teeth, and as the said portions of ribs A1 and B1 will travel axially in opposite directions as the grinding wheels are rotated the blank will rotate about its axis 11 during its traverse between the grinding wheels such that the teeth will be ground around the whole of its periphery. This is illustrated in FIGURE 1 where it is assumed that, when viewed from the right-hand end, grinding wheel A is driven counter-clockwise and grinding wheel B clockwise. During rotation of wheel A the said portion of rib A1 will travel to the left as indicated by arrow 15, and the corresponding portion of rib B1 will travel to the right as indicated by arrow 16.

It will readily be appreciated that if the helix angle of the ribs is equal to the helix angle of the teeth to be formed in the blank, the two grinding wheels can be arranged with their axes parallel to each other, and at right-angles to the line 11, as shown in FIGURE 2, which latter, for the convenience of description, only shows grinding wheel A.

It will also be apparent that if the axes of the grinding wheels are inclined oppositely at the same angles as the pitch of their respective helical tooth-forming ribs, the said portions of the latter will be parallel to each other, and to line 11, so that axially-directed teeth can be ground in the blank as shown in FIGURE 3.

Figure 4:
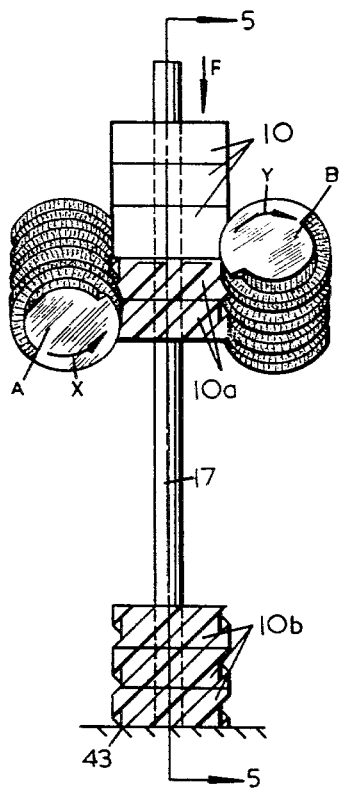

FIGURE 4 illustrates one method of feeding the cylindrical blanks 10 between the two grinding wheels A and B which are oppositely inclined as taught in FIGURE 1 and driven in opposite directions as indicated by the arrows X and Y. The cylindrical blanks 10 have coaxial bores by which they are slidably supported from a vertical shaft 17 that is rigidly carried by a casing 43 and extends centrally through the pass between the two grinding wheels. As will be appreciated from a consideration of arrows X and Y the rotary movement of the grinding wheels A and B tends to urge the cylindrical blanks upwardly away from the grinding wheels. However the weight of the cylindrical blanks 10, as represented by arrow F. is sufficient for feeding the blanks between the grinding wheels as the helical gear teeth are generated. FIGURE 4 shows two blanks 10a with partially formed helical teeth, and three completely formed gears 10b which have slid down the shaft 17 under their own weight. After all the blanks have been processed the casing 43 is moved downwards so that the finished gears may be withdrawn.

Figure 5:
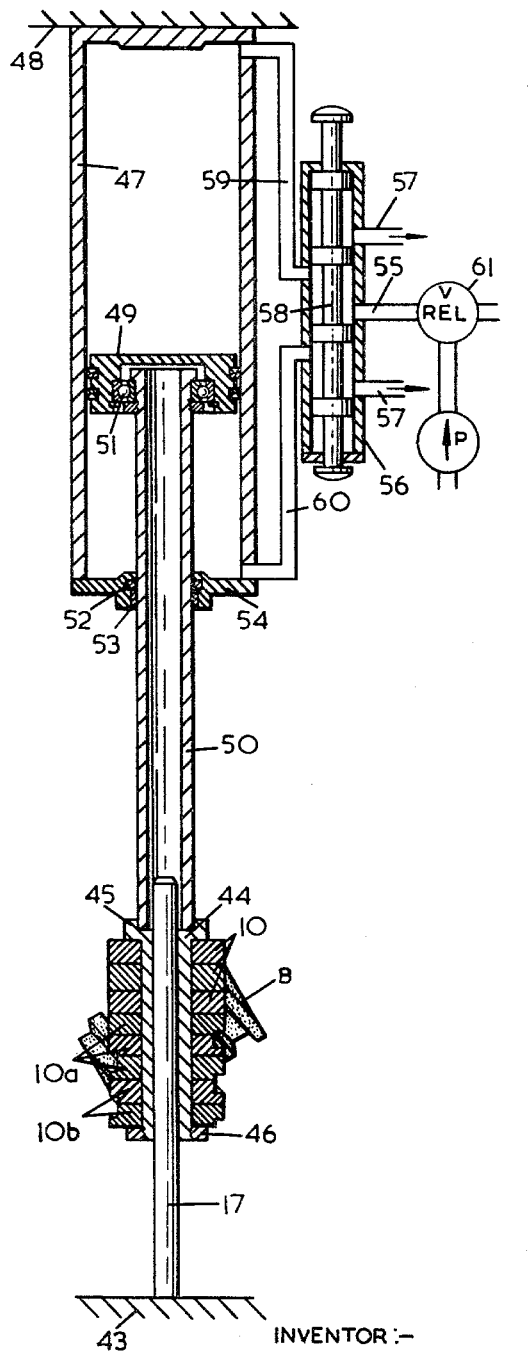

In some circumstances it is preferable to increase the feeding force and one arrangement for achieving this is shown in FIGURE 5. In the latter the blanks 10 have their coaxial bores of larger diameter than the shaft 17 and a sleeve 44 is employed. The blanks 10 are a close fit on the external diameter of the sleeve 44, the internal bore of the sleeve being a close sliding fit on the shaft 17, and the blanks 10 are held axially fast with the sleeve 44 by an integral radial flange 45 and an opposed nut 46. To provide the increased feeding force a cylinder 47 reacts against a fixed casing 48 and is provided with a coacting double-acting piston 49. The latter is held axially fast with a hollow piston rod 50 by a combined thrust and journal bearing 51. The piston rod 50 extends through an air seal 52 and a bush 53 carried by a closure member 54 of the cylinder 47 and reacts against the flange 45 of the sleeve 44. During the grinding operation the blanks 10 and sleeve 44 will be rotated by the action of the grinding wheels, and the engagement of the piston rod 50 with the sleeve 44 will result in corresponding rotation of the piston rod 50—thus it will be appreciated that the function of the bearing 51 is to allow the piston rod 50 to rotate without causing corresponding rotation of the piston 49. A pump P supplies air under pressure to the inlet port 55 of a five port spool valve 56 of well-known construction. The spool valve 56 has two outlet ports 57 and its manually operated pressure balanced spool 58 is designed, in the extreme upper position shown in the drawing, to connect the inlet port 55 to a duct 59 leading to the portion of the cylinder 47 above the piston 49, and to connect the portion of the cylinder 47 below the piston 49 through a duct 60 to one of the exhaust ports 57. The maximum pressure generated by the pump P is regulated by a pressure relief valve 61 and it will accordingly be appreciated that the maximum force applied to the sleeve 44 will be correspondingly regulated. After the finished blanks have been withdrawn the spool valve is moved to its extreme lower position so as to reverse the connections to ducts 59 and 60 for withdrawing the piston rod 50 for the next sleeve 44 bearing a batch of blanks 10 to be processed.

Figure 6:
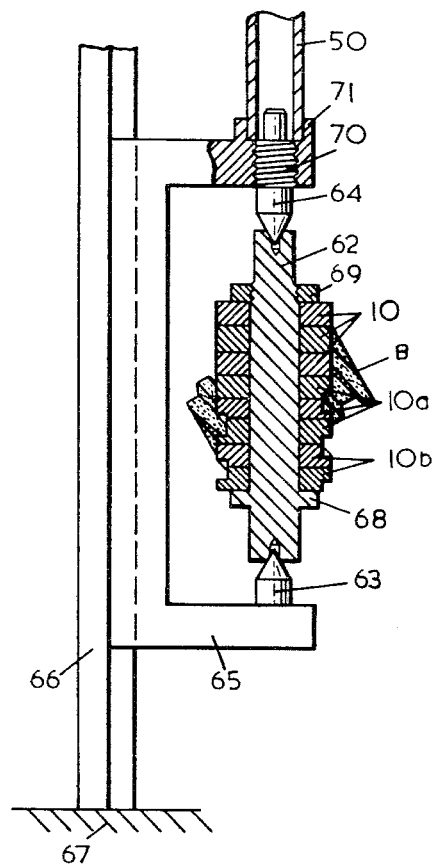

FIGURE 6 shows a modification of FIGURE 5 in which a series of blanks 10 are carried by a mandrel 62 which is supported for rotation about its own axis by centres 63 and 64, and for axial movement by a slide 65 associated with a frame 66 secured to a fixed casing 67. The blanks are held axially and rotatively fast with the mandrel 62 by an integral flange 68 and an opposed nut 69. The centre 64 is connected to the slide 65 through screwthreads 70 which are utilised for adjusting the relative axial positions of the centres so that the mandrel 62 and associated blanks 10 may be removed. To provide an increased feeding force a piston and cylinder assembly such as that described fully with reference to FIGURE 5 is used to so that the piston rod 50 engages in a flange 71 of the slide 65.

Figure 7:
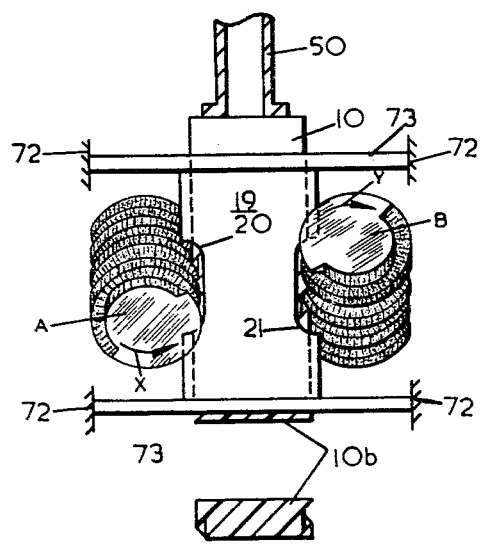

FIGURE 7 shows an alternative arrangement to FIGURES 4, 5 or 6 and employs a tubular guide 19 which is gapped laterally at 20, 21 to provide access for the grinding wheels A and B to the blanks 10 as they are fed through the grinding zone by the piston rod 50 of a piston and cylinder assembly such as that described fully with reference to FIGURE 5. The tube 19 is supported from a stationary structure 72 by a pair of transverse plates 73, and the internal diameter of the tube provides a slight sliding clearance for the blanks.

It is important to note that whereas the shaft 17 of FIGURE 4 should be vertical, there is no limitation on the attitude of the apparatus shown in any of FIGURES 5 to 7.

Figure 8:
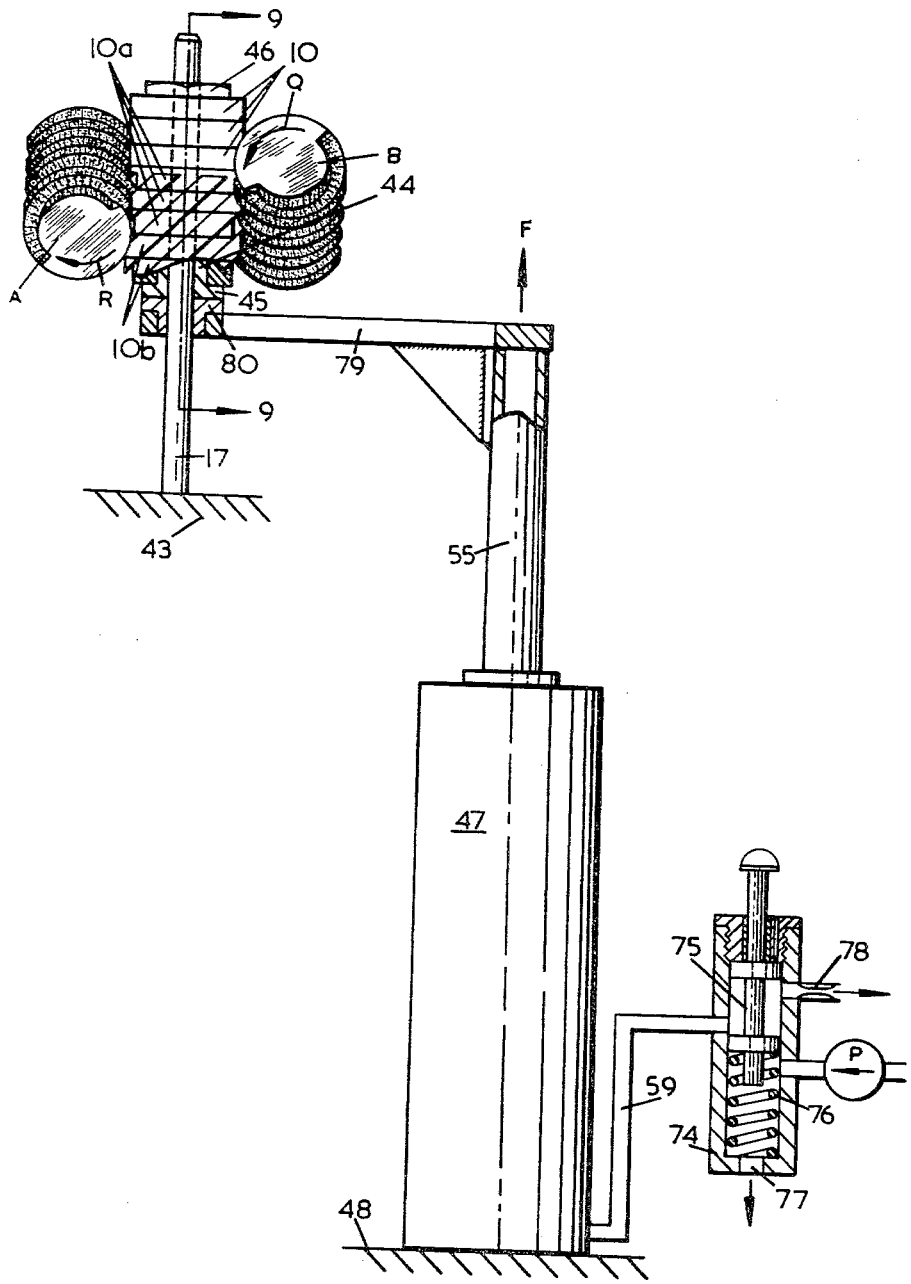
FIGURE 8 is a diagrammatic view illustrating another manner in which the blanks can be fed for the grinding of teeth therein.

FIGURE 8 is similar in many respects to FIGURE 5 and accordingly the same reference numerals have been employed to denote corresponding components. The basic difference is, however, that the direction of rotation of the two grinding wheels A and B have been reversed as indicated by arrows R and Q so that the grinding wheels tend to draw the cylindrical blanks 10 into the pass. To prevent the grinding wheels from being damaged by this self-feeding action a cylinder 47, of very similar construction to the cylinder shown in FIGURE 5, is used to resist the self-feeding action so that the resultant force is of an appropriate value for feeding the blanks 10 through the grinding wheels. The cylinder 47 differs from that shown in FIGURE 5 in that it is single acting and has only one supply duct 59 which is controlled by a four port spool valve 74 of which the spool 75 is biased upwards by a spring 76 so that the air pump P discharges to exhaust through port 77 and the duct 59 discharges to exhaust through a calibrated orifice 78. When the spool 75 is depressed, the duct 59 is isolated from the exhaust orifice 78 and is connected to be supplied by the pump P so that the piston rod 55 is moved upwards to its full extent. The piston rod 55 is rigidly secured to a framework 79 which carries a bearing pad 80 that is a sliding fit on the shaft 17 and bears against the radial flange 45 of a sleeve 44 supporting a series of cylindrical blanks 10 as described with reference to FIGURE 5. As soon as the piston rod 55 has reached its upper position and a sleeve 44 having a set of fresh cylindrical blanks has been placed on spindle 17, the spool 75 is released so that the air inside the cylinder 47 is slowly exhausted through the orifice 78 whereby the sleeve 44 will pass in between the grinding wheels A and B at a predetermined controlled rate of feed.

Figure 9:
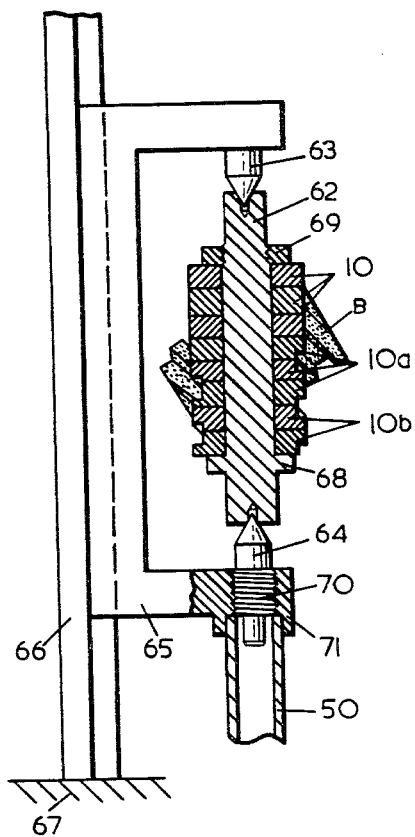
FIGURES 9 and 10 are modifications of FIGURE 8 as if taken on the line 9—9 of FIGURE 8.

FIGURE 9 shows an alternative arrangement to FIGURE 8 and, as it is very similar to FIGURE 6, the same reference numerals have been employed to denote corresponding components. The only modifications that have been incorporated in FIGURE 9 are that the centres 63 and 64 have been interchanged so that the piston rod 50 acts upwards on the slide 65, and the piston rod 50 is controlled by the valve and cylinder arrangement described with reference to FIGURE 8 so that the rate of feed of the blanks 10 between the grinding wheels A and B will be controlled.

Figure 10:
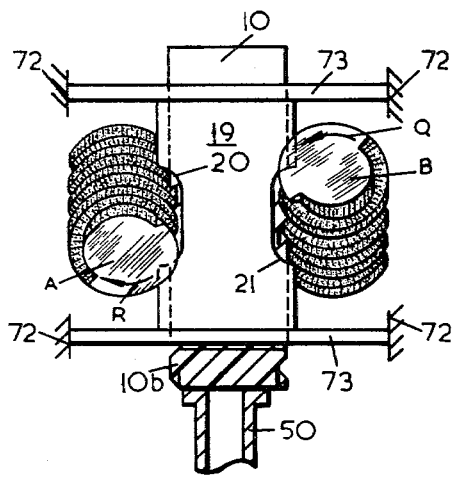

FIGURE 10 shows an alternative arrangement to FIGURES 8 and 9 and, as it is very similar to FIGURE 7, the same reference numerals have been employed to denote corresponding components. The only modification is that the piston rod 50 acts upwards on the finished gears 10b and is controlled by the valve and cylinder arrangement described with reference to FIGURE 8 so that the rate of feed of the blanks 10 between the grinding wheels A and B will be controlled.

So that the mounting and driving of the grinding wheels A and B will be clearly understood FIGURE 11 illustrates the case in which the grinding wheels are parallelly spaced—that is the arrangement taught in FIGURE 2. In FIGURE 11 the grinding wheels A and B are journalled from bearing posts 24 carried by a base plate 25, and are driven by an electric motor 30 through a gear train 26, 27, 28 and 29. Gears 26 and 29 have the same number of teeth so that the grinding wheels A and B will be driven at the same speed, and the gear 28 acts as a reversing idler so that grinding wheel A will be driven in the opposite sense to grinding wheel B. FIGURE 12 is very similar to FIGURE 11 and shows the arrangement when the grinding wheels A and B have their axes oppositely inclined—that is the arrangements taught in FIGURES 1 and 3. The only differences that occur in FIGURE 12 are that the bearing posts 24 are arranged so that the axes of the grinding wheels A and B are inclined as required, and the drive is through a skew gear train 26a, 27a, 28a and 29a.

It is emphasized that the proportional sizes of the grinding wheels and blank have not been shown realistically in FIGURES 1 to 12 owing to the necessity for showing small parts clearly. In practice the grinding wheels would have much greater diameters than those shown in FIGURES 1 to 12, and the minimum diameters would be of the order shown in FIGURES 13 and 14. These diameters could be increased to about 10 times the diameter of the blank, and the axial length of the grinding wheels could be reduced to the order of the diameter of the blank; although it would be possible to increase the axial lengths of the grinding wheels so that two or more blanks, placed side-by-side, could be treated simultaneously.

What I claim as my invention and desire to secure by Letters Patent of the United States is:

1. The method of manufacturing a toothed gear wheel, having a cylindrical envelope, which includes feeding a plain cylindrical blank, in the direction of its axis, between the facing peripheral portions of two laterally-spaced grinding wheels with helically-arranged tooth-forming ribs on their peripheries, driving the grinding wheels in opposite senses in unison such that the ribs rotate the blank at the same time as they grind the teeth therein.

2. The method of manufacturing an axially-toothed gear wheel, having a cylindrical envelope, which includes feeding a plain cylindrical blank, in the direction of its axis, between the facing peripheral portions of two laterally-spaced grinding wheels with helically-arranged tooth-forming ribs on their peripheries and having their axes oppositely inclined such that the portions of the ribs, at the adjacent sides of the two grinding wheels, which engage opposite sides of the blank are parallel to the axis of the latter, and driving the grinding wheels in opposite senses in unison such that the ribs rotate the blank at the same time as they grind the teeth therein.

3. The method of manufacturing a helically-toothed gear wheel, having a cylindrical envelope, which includes feeding a plain cylindrical blank, in the direction of its axis, between the facing peripheral portions of two laterally-spaced grinding wheels with helically-arranged tooth-forming ribs on their peripheries such that the portions of the ribs, at the adjacent sides of the two grinding wheels, which engage opposite sides of the blank are inclined oppositely to each other at the helix angle to be given to the teeth of the gear wheel, and driving the grinding wheels in opposite directions in unison such that the ribs rotate the blank at the same time as they grind the teeth therein.

4. Apparatus, for manufacturing a toothed gear wheel, comprising a pair of grinding wheels with helically-arranged tooth-forming ribs on their peripheries, means rotatively supporting said grinding wheels in laterally-spaced relationship whereby to leave a pass between them, means for driving said grinding wheels in opposite senses, and means for feeding a plain cylindrical blank in the direction of its length through the pass, the width of the pass in relation to the diameter of the blank being such that the ribs of the grinding wheels will grind teeth in the periphery of the blank while the latter is traversed through the pass, and the helix angles of the ribs being such that their portions which engage the blank in the pass are parallel to the intended direction of the teeth.

5. Apparatus, according to claim 4, in which the grinding wheels have at least two helically-arranged tooth-forming ribs arranged in the manner of a multi-start screw thread.

6. Apparatus, for manufacturing an axially-toothed gear wheel, comprising a pair of grinding wheels with helically-arranged tooth-forming ribs on their peripheries, means rotatively supporting said grinding wheels in laterally-spaced relationship and with their axes oppositely inclined in respective parallel planes whereby to leave a pass between them, means for driving said grinding wheels in opposite senses, and means for feeding a plain cylindrical blank in the direction of its length and parallelly between said parallel planes through the pass in the position where said grinding wheels cross each other, the feed movement of said blank also being in a direction making equal angles with the axes of said grinding wheels, the width of the pass in relation to the diameter of the blank being such that the ribs of the grinding wheels will grind teeth in the periphery of the blank while the latter is traversed through the pass, and the helix angles of the ribs and the angles of inclination of the axes of said grinding wheels being such that the portions of said ribs which engage the blank in the pass are parallel to the axis of the blank.

7. Apparatus, according to claim 6, in which the grinding wheels have at least two helically-arranged tooth-forming ribs arranged in the manner of a multi-start screw thread.

8. Apparatus, for manufacturing a helically-toothed gear wheel, comprising a pair of grinding wheels with helically-arranged tooth-forming ribs on their peripheries, means rotatively supporting said grinding wheels in laterally-spaced parallel relationship whereby to leave a pass between them, means for driving said grinding wheels in opposite senses, and means for feeding a plain cylindrical blank in the direction of its length through the pass, the direction in which the blank is fed through the pass being also at right-angles to the plane containing the axes of the grinding wheels, the width of the pass in relation to the diameter of the blank being such that the ribs of the grinding wheels will grind teeth in the periphery of the blank while the latter is traversed through the pass, and the helix angles of the ribs being such that their portions which engage the blank in the pass are directed for grinding the teeth at the desired helix angle.

9. Apparatus, according to claim 8, in which the grinding wheels have at least two helically-arranged tooth-forming ribs arranged in the manner of a multi-start screw thread.

10. Apparatus, for manufacturing a helically-toothed gear wheel, comprising a pair of grinding wheels with helically-arranged tooth-forming ribs on their peripheries, means rotatively supporting said grinding wheels in laterally-spaced relationship and with their axes oppositely inclined in respective parallel planes whereby to leave a pass between them, means for driving said grinding wheels in opposite senses, and means for feeding a plain cylindrical blank in the direction of its length and parallelly between said parallel planes through the pass in the position where said grinding wheels cross each other, the feed movement of said blank also being in a direction making equal angles with the axes of said grinding wheels, the width of the pass in relation to the diameter of the blank being such that the ribs of the grinding wheels will grind teeth in the periphery of the blank while the latter is traversed through the pass, and the helix angles of the ribs and the angles of inclination of the axes of said grinding wheels being such that the portions of said ribs which engage the blank in the pass are directed for grinding the teeth at the desired helix angle.

11. Apparatus, according to claim 10, in which the grinding wheels have at least two helically-arranged tooth-forming ribs arranged in the manner of a multi-start screw thread.

12. Apparatus, for manufacturing a toothed gear wheel, comprising a pair of grinding wheels with helically-arranged tooth-forming ribs on their peripheries, means rotatively supporting said grinding wheels in laterally-spaced relationship whereby to leave a pass between them, means for driving said grinding wheels in opposite senses, and means for feeding a plain cylindrical blank in the direction of its length through the pass, the senses in which said grinding wheels are driven opposing the feed movement of said blank, and the means for feeding said blank through said pass including a bias acting in opposition to the effect of said grinding wheels on the feed movement of said blank, the width of the pass in relation to the diameter of the blank being such that the ribs of the grinding wheels will grind teeth in the periphery of the blank while the latter is traversed through the pass, and the helix angles of the ribs being such that their portions which engage the blank in the pass are parallel to the intended direction of the teeth.

13. Apparatus, according to claim 12, in which the blank is guided for the feeding movement by a shaft which extends through the pass and on which the blank is journalled.

14. Apparatus, according to claim 12, in which the blank is guided for the feeding movement by an axially-floating mandrel which extends through the pass and on which the blank is mounted.

15. Apparatus, according to claim 12, in which the blank is guided for the feeding movement by a tube which extends through the pass and in which the blank is inserted, opposite sides of the tube wall being removed for giving the grinding wheels access to the blank.

16. Apparatus, for manufacturing a toothed gear wheel, comprising a pair of grinding wheels with helically-arranged tooth-forming ribs on their peripheries, means rotatively supporting said grinding wheels in laterally-spaced relationship whereby to leave a pass between them, means for driving said grinding wheels in opposite senses, and means for feeding a plain cylindrical blank in the direction of its length through the pass, the senses in which said grinding wheels are driven applying a feed movement to said blank, and the means for feeding said blank through said pass including means for reducing the speed of the feed applied by said grinding wheels so that the teeth will be ground in the blank and the latter will not jam between the grinding wheels, the width of the pass in relation to the diameter of the blank being such that the ribs of the grinding wheels will grind teeth in the periphery of the blank while the latter is traversed through the pass, and the helix angles of the ribs being such that their portions which engage the blank in the pass are parallel to the intended direction of the teeth.

17. Apparatus, according to claim 16, in which the blank is guided for the feeding movement by a shaft which extends through the pass and on which the blank is journalled.

18. Apparatus, according to claim 16, in which the blank is guided for the feeding movement by an axially-floating mandrel which extends through the pass and on which the blank is mounted.

19. Apparatus, according to claim 16, in which the blank is guided for the feeding movement by a tube which extends through the pass and in which the blank is inserted, opposite sides of the tube wall being removed for giving the grinding wheels access to the blank.

References Cited by the Examiner

UNITED STATES PATENTS

| | | | |
|---|---|---|---|
| 1,267,970 | 5/1918 | Burgess | 90—4 |
| 1,612,830 | 1/1927 | Olson | 51—95 |
| 1,912,216 | 5/1933 | Page | 51—287 X |
| 2,032,589 | 3/1936 | Overstedt | 51—84 |
| 2,232,408 | 2/1941 | Shaw | 51—84 |
| 2,607,175 | 8/1952 | Osplack | 51—287 |
| 2,924,910 | 2/1960 | Klomp | 51—88 X |

LESTER M. SWINGLE, *Primary Examiner.*

FRANK E. BAILEY, *Examiner.*